(12) United States Patent
Moya

(10) Patent No.: US 12,316,180 B2
(45) Date of Patent: May 27, 2025

(54) ROTARY ELECTRIC MACHINE STATOR WITH ASYMMETRIC WINDING

(71) Applicant: NIDEC PSA EMOTORS, Carrieres sous Poissy (FR)

(72) Inventor: Cyril Moya, Chatou (FR)

(73) Assignee: NIDEC PSA EMOTORS, Carrieres Sous Poissy (FR)

( * ) Notice: Subject to any disclaimer, the term of this patent is extended or adjusted under 35 U.S.C. 154(b) by 272 days.

(21) Appl. No.: 17/775,821

(22) PCT Filed: Nov. 19, 2020

(86) PCT No.: PCT/FR2020/052131
§ 371 (c)(1),
(2) Date: May 10, 2022

(87) PCT Pub. No.: WO2021/105593
PCT Pub. Date: Jun. 3, 2021

(65) Prior Publication Data
US 2022/0385130 A1    Dec. 1, 2022

(30) Foreign Application Priority Data
Nov. 26, 2019  (FR) ...................................... 1913234

(51) Int. Cl.
*H02K 3/28*    (2006.01)
*H02K 3/50*    (2006.01)

(52) U.S. Cl.
CPC ................. *H02K 3/28* (2013.01); *H02K 3/50* (2013.01); *H02K 2203/09* (2013.01)

(58) Field of Classification Search
CPC .. H02K 15/0081; H02K 15/0421; H02K 3/50; H02K 3/28; H02K 2203/09

(Continued)

(56) References Cited

U.S. PATENT DOCUMENTS 6,979,926 B2 *  12/2005  Ogawa ..................... H02K 3/12
                                                310/201
9,496,773 B2 *  11/2016  Ishigami ............... B60L 15/007
(Continued)

FOREIGN PATENT DOCUMENTS

EP     1971011 A2   9/2008
WO  2019062915 A1   4/2019

OTHER PUBLICATIONS

International Search Report for PCT/FR2020/052131 mailed Jan. 26, 2021.
Written Opinion for PCT/FR2020/052131 mailed Jan. 26, 2021.

*Primary Examiner* — Alex W Mok
(74) *Attorney, Agent, or Firm* — Sandberg Phoenix & von Gontard P.C.

(57) ABSTRACT

Disclosed is a stator (2) comprising a stator body (25) having notches (21) formed between teeth (23), electrical conductors (22) being housed in the notches (21), at least one part of the electrical conductors being in the form of a U-shaped pin, each comprising first (22c) and second (22f) axially extending legs in the first (A) and second (R) notches, respectively, at least one of the first (22e) and second (22f) legs of the electrical conductors (22) extending out of the notches via an inclined welding portion, at least one part of the electrical conductors each having a welding portion, innermost with respect to the longitudinal axis of the stator, the innermost welding portions being inclined with the same inclination with respect to the plane perpendicular to the longitudinal axis of the stator.

15 Claims, 14 Drawing Sheets

(58) Field of Classification Search
USPC .......................................................... 310/71
See application file for complete search history.

(56) References Cited

U.S. PATENT DOCUMENTS

| | | | |
|---|---|---|---|
| 10,239,154 B2* | 3/2019 | Ciampolini | H02K 3/50 |
| 10,263,486 B2* | 4/2019 | Nakamura | H02K 3/28 |
| 10,277,088 B2* | 4/2019 | Ciampolini | H02K 3/50 |
| 10,326,326 B2* | 6/2019 | Laldin | H02K 3/28 |
| 10,355,547 B2* | 7/2019 | Hino | H02K 3/48 |
| 10,411,526 B2* | 9/2019 | Nakayama | H02K 1/04 |
| 10,454,322 B2* | 10/2019 | Nakayama | H02K 3/12 |
| 2006/0033394 A1* | 2/2006 | Ogawa | H02K 3/12 310/179 |
| 2008/0224560 A1* | 9/2008 | Yoshida | H02K 3/505 310/184 |
| 2013/0300246 A1 | 11/2013 | Kaimori et al. | |

* cited by examiner

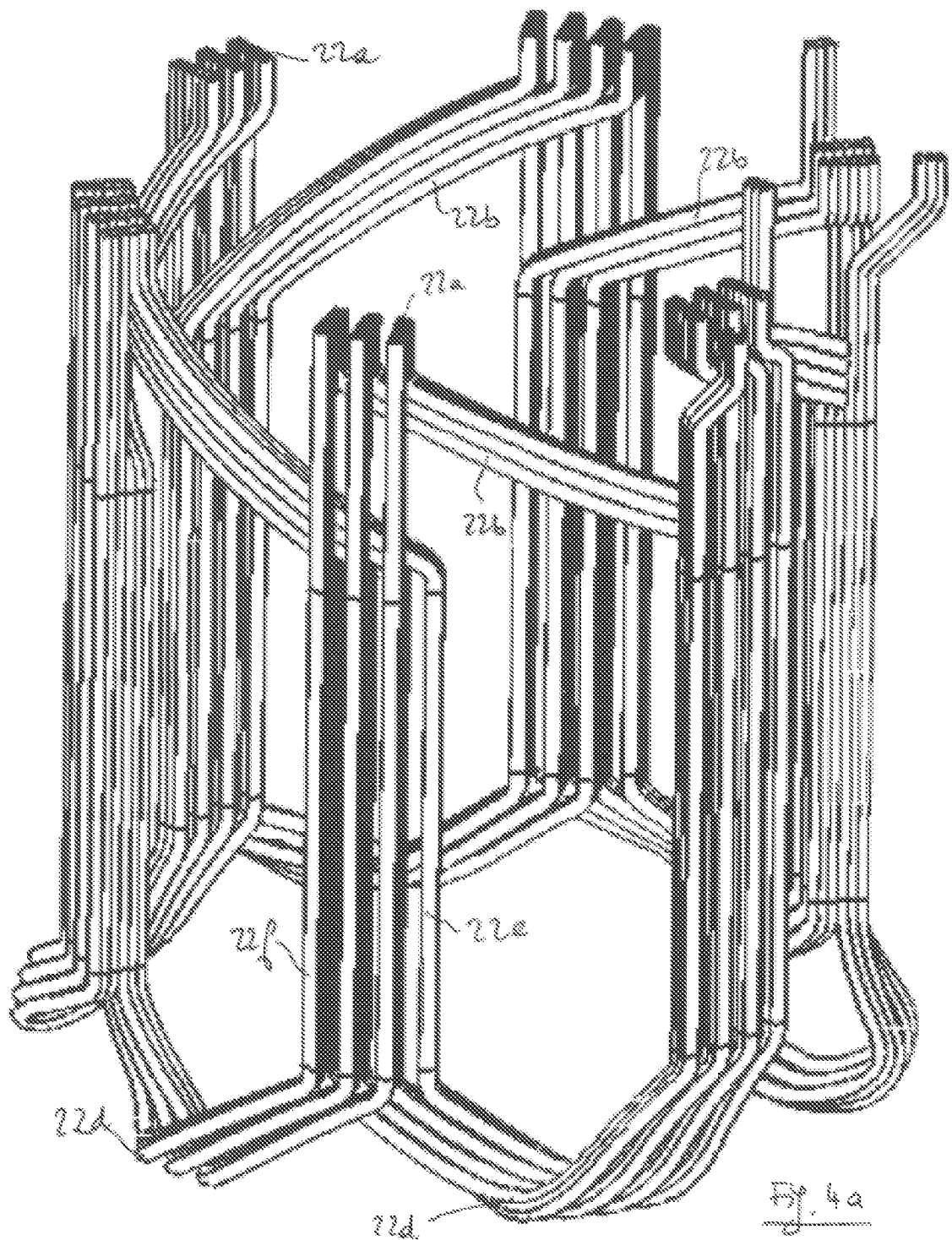

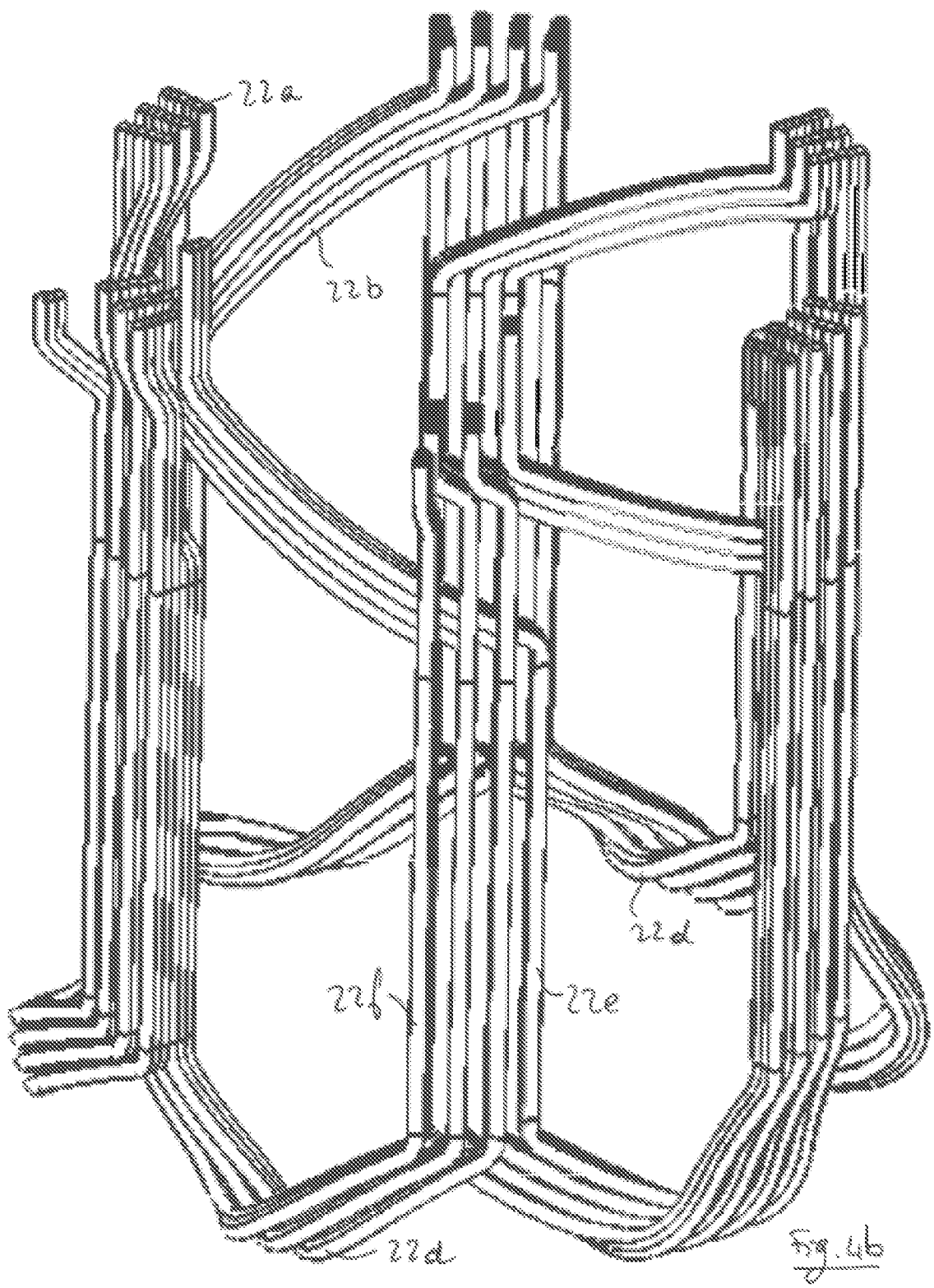

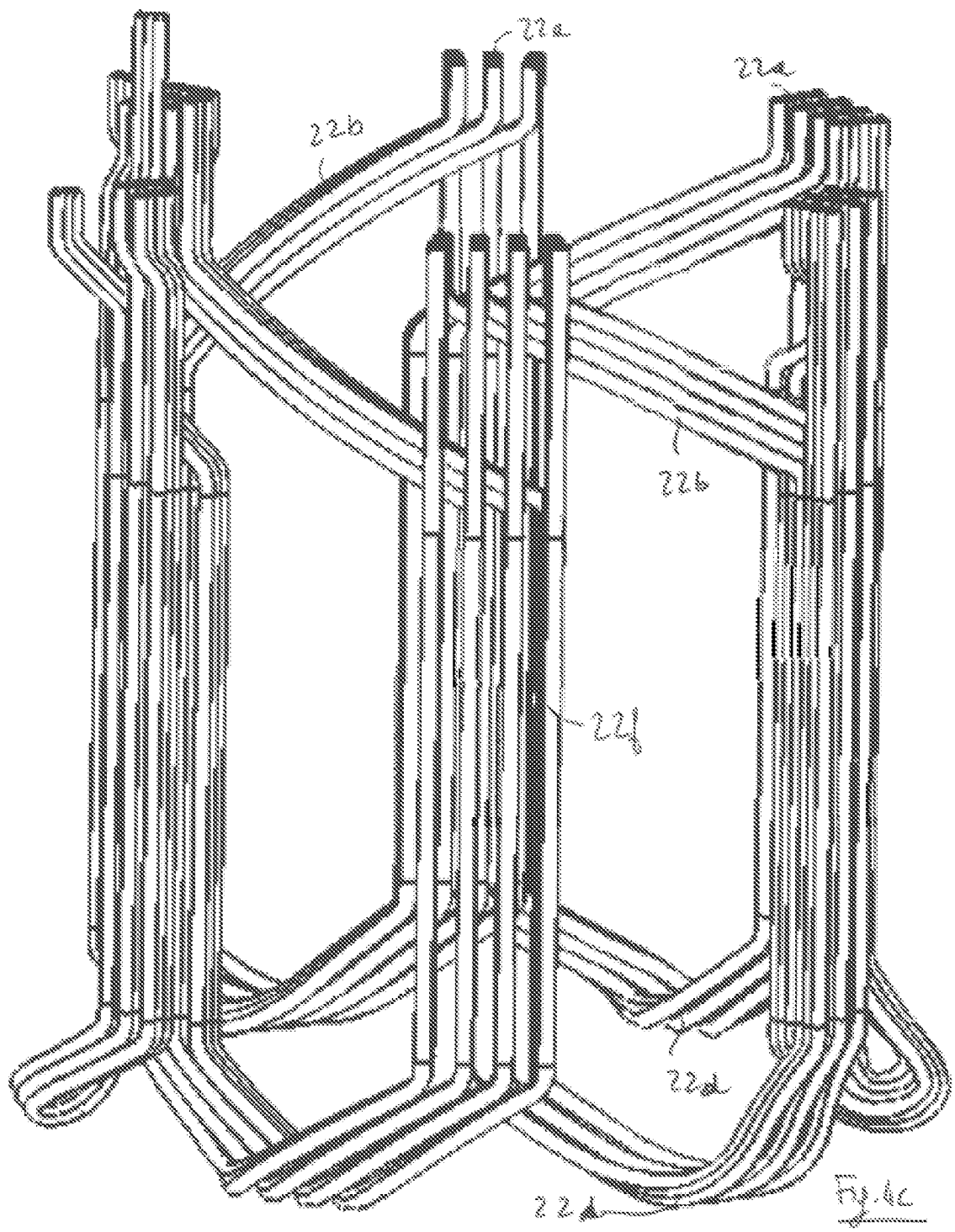

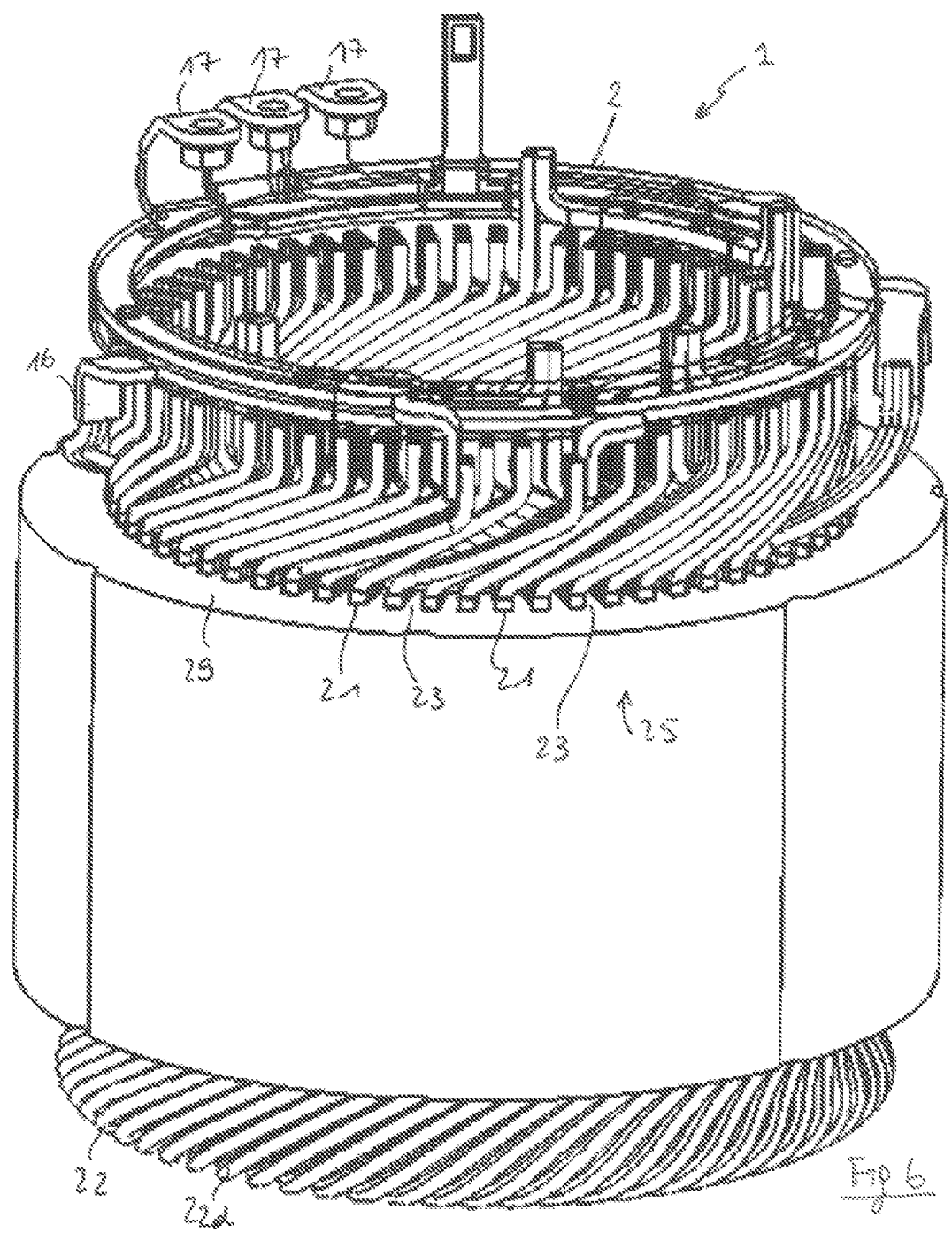

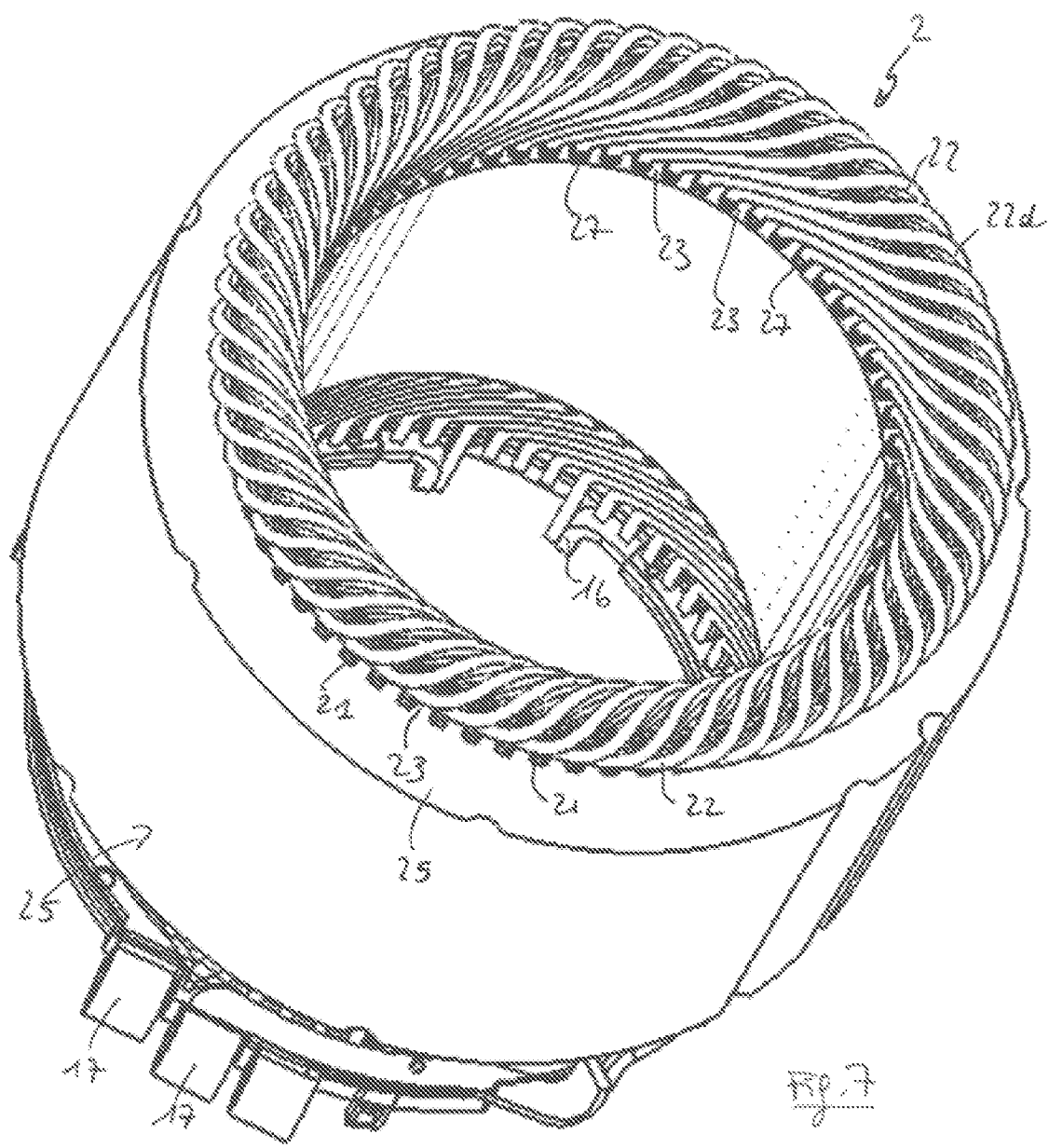

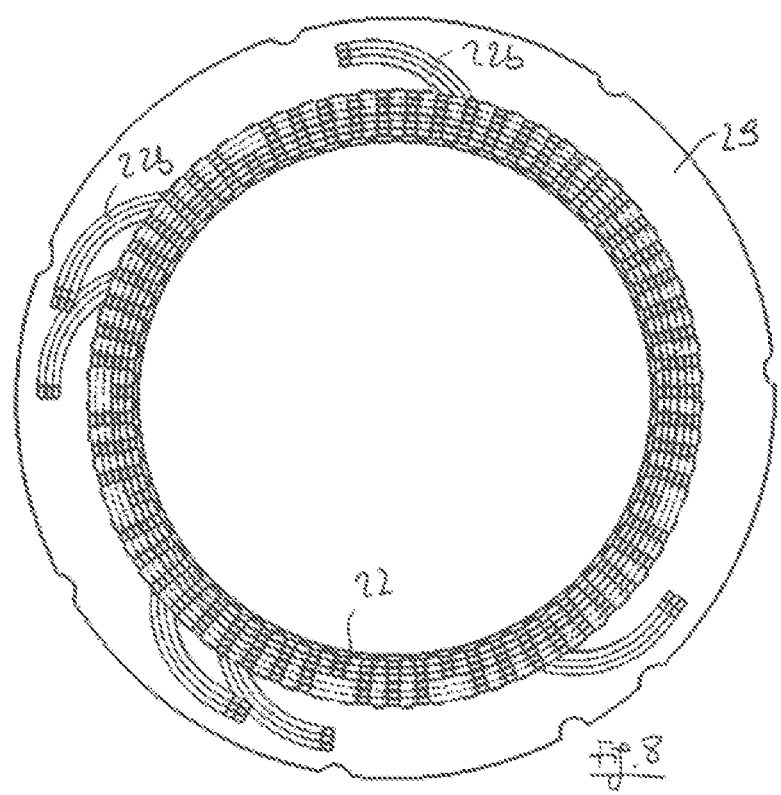
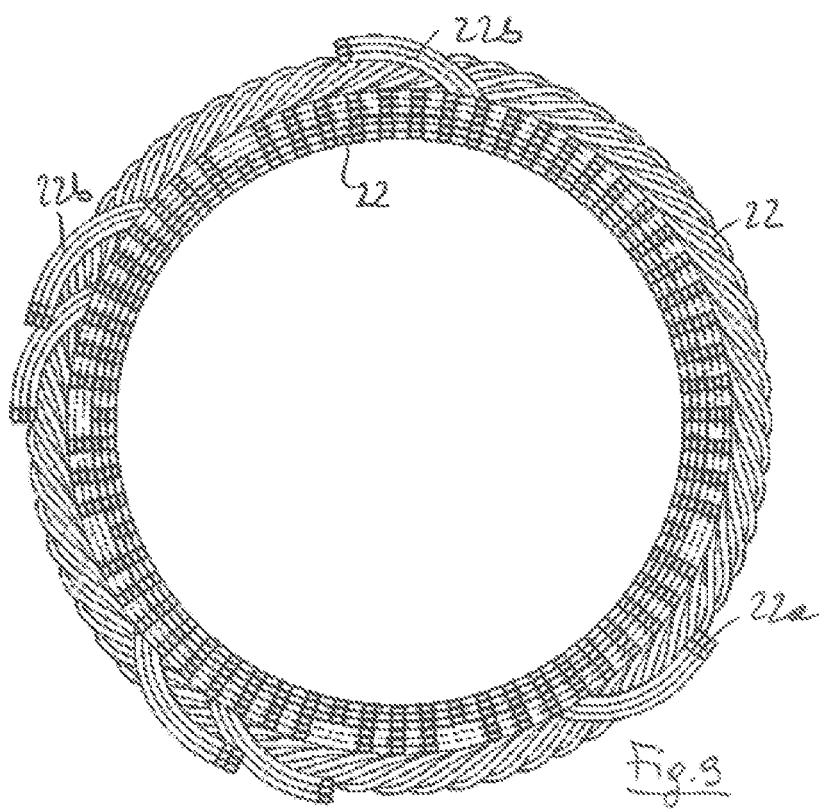

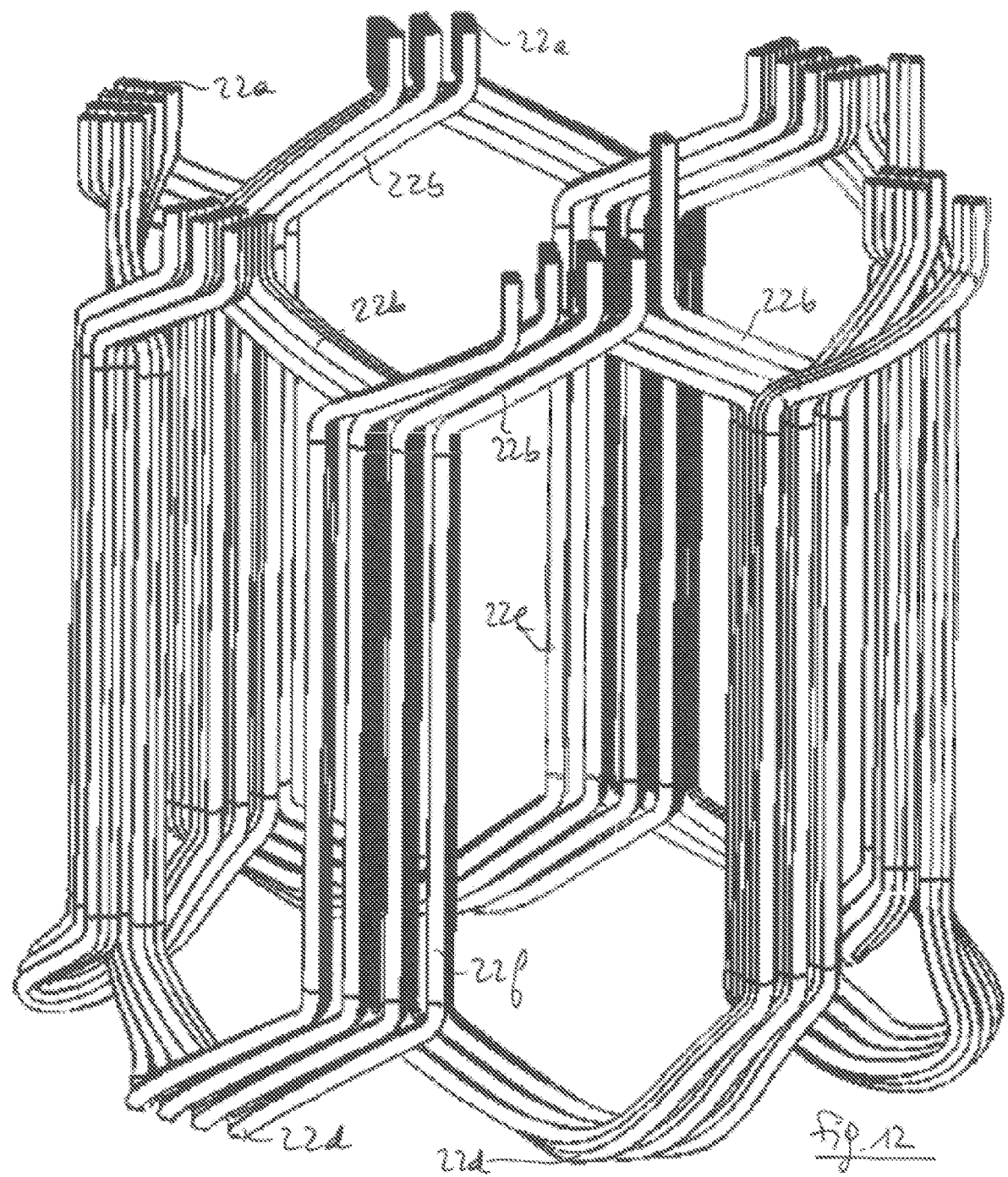

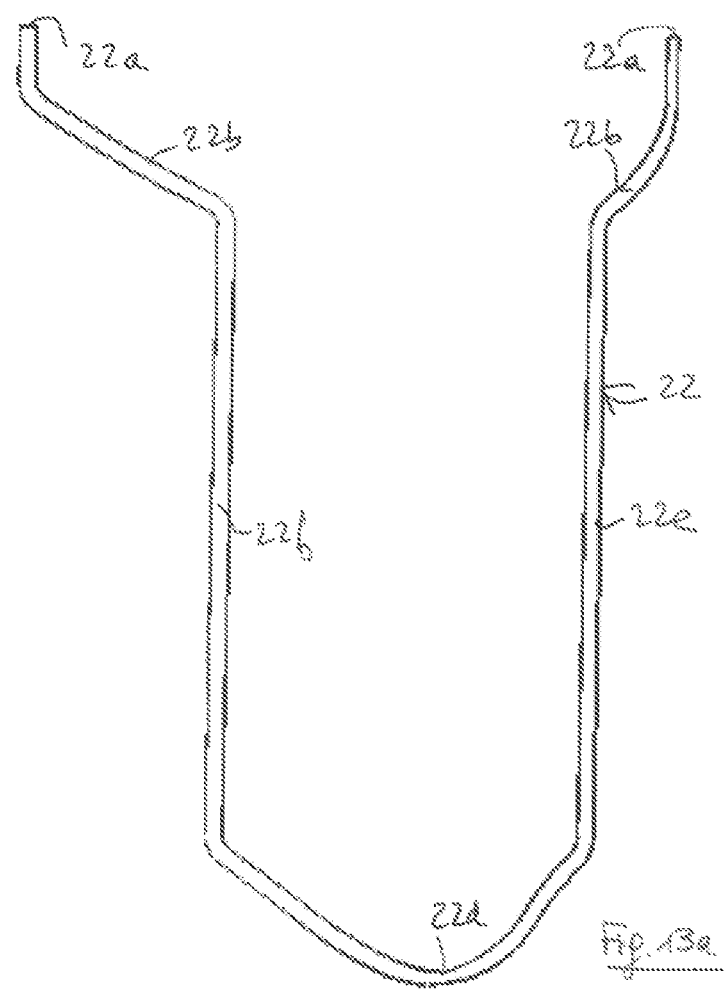

ROTARY ELECTRIC MACHINE STATOR WITH ASYMMETRIC WINDING

CROSS-REFERENCE TO RELATED APPLICATIONS

BACKGROUND

This application is the US National Stage under 35 USC § 371 of International Application No. PCT/FR2020/052131, filed 19 Nov. 2020 which claims the priority of French application 1913234 filed on Nov. 26, 2019, the content (text, drawings and claims) of both being incorporated here by reference.

The present invention relates to rotary electric machines, and more particularly to the stators of such machines.

TECHNICAL FIELD

The invention relates more particularly to synchronous or asynchronous AC machines. It relates in particular to traction or propulsion machines for electric motor vehicles (Battery Electric Vehicle) and/or hybrid motor vehicles (Hybrid Electric Vehicle-Plug-in Hybrid Electric Vehicle), such as individual cars, vans, trucks or buses. The invention also applies to rotary electric machines for industrial and/or energy production applications, in particular naval, aeronautical or wind power applications.

There is a need to benefit from a stator for a rotary electric machine that is easy to assemble, allowing efficient filling of the notches, while ensuring satisfactory electromagnetic performance.

There is also a need to reduce the cost of manufacturing electric machines, in particular by simplifying the winding of the stator, for example by minimizing the number of parts to be used.

There is also a need to further improve the stators of electric machines, and in particular to reduce torque ripples and Joule AC losses by induced currents, electromagnetic vibrations and noise.

SUMMARY

Stator

In accordance with one aspect, a stator of a rotary electric machine comprises a stator body comprising notches formed between teeth, electrical conductors being housed in the notches, at least one part of the electrical conductors, even a majority of the electrical conductors, being in the form of a U-shaped pin, each comprising first and second legs extending axially respectively in first A and second R notches, at least one of the first and second legs of the electrical conductors extending out of the notches via a welding portion that is inclined with respect to a plane perpendicular to a longitudinal axis of the stator so as to overhang the stator body circumferentially at a notch or a tooth, this notch or tooth being separated from the first A or the second R notch respectively by a number N1 and/or N2 of teeth, at least some of the electrical conductors each having an innermost welding portion relative to the longitudinal axis of the stator, or even a majority, better still all of the electrical conductors each having an innermost welding portion relative to the longitudinal axis of the stator, said innermost welding portions being inclined with the same inclination with respect to the plane perpendicular to the longitudinal axis of the stator.

The numbers N1 and N2 can be equal or different.

The first A and second R notches are separated by a number Nd of teeth.

The number Nd of teeth is preferably the same for all the electrical conductors of the stator in the form of U-shaped pins. For the number Nd of teeth, reference may also be made to the pitch of an electrical conductor, which is the same for all the electrical conductors of the stator that are in the form of a U-shaped pin. This facilitates the manufacture of the U-shaped pins, and the step of positioning them in the stator body is simplified, in particular their insertion.

The constant spacing between the legs of all the electrical conductors allows the height of the lead-in wires to be reduced on the side opposite the welds, which is advantageous for minimizing the size of the machine and the quantity of material, especially copper, necessary for the electrical conductors. There is thus a better compactness of the stator, including when it is assembled, and therefore of the resulting machine, which can in particular be shorter. The rotor shaft can be shorter, the casing can be shorter, and the integration of the machine into its usage environment can be facilitated. Finally, the overall mass of the machine can be minimized.

Furthermore, the spacing between each of the lead-in wires is more regular, which can make it possible to minimize the risks of contact therebetween, and thus make it possible to eliminate the step of covering them with an insulator.

Furthermore, the machine makes it possible to reduce the number of pin shapes to be used in the same stator. Thus, the manufacture of the stator can be accelerated, with fewer manufacturing steps. The manufacture, the space required and the tools to be used are simplified.

Finally, the machine makes it possible to free up space on either side of the pins at the notch outlet, which can make it possible to position the connections there to the other phases or to an inverter, in particular on the side of the yoke of the stator. In one embodiment, the spacing between the pins at the notch outlet can be constant or substantially constant. This can facilitate the realization of the welds on the one hand, and the cooling of the electrical conductors on the other hand.

In the invention, N1 can vary from Nd/2−0.5 to Nd teeth, and N2 can vary from 0 to Nd/2+1.5 teeth.

In one embodiment, N1 is equal to Nd or Nd+1 and N2 is equal to 0 or 1.

In another embodiment, N1 and N2 are equal or nearly equal. N1 and N2 can each be equal to one of Nd/2 or Nd/2+0.5 or Nd/2−0.5 or Nd/2+1 or Nd/2+1.5.

In one embodiment, the welding portion of the second leg of the electrical conductor is aligned with said leg. In this case, N2 is zero.

In the other cases where N2 is non-zero, each of the first and second legs of the electrical conductors can be extended out of the notches via a welding portion that is inclined with respect to a plane perpendicular to a longitudinal axis of the stator to overhang the stator body circumferentially at a notch or a tooth, this notch being separated from the first A or the second R notch, respectively, by a number N1 and N2 of teeth, the numbers N1 and N2 possibly being equal or different.

When N1 and N2 are equal or nearly equal, the compactness of the stator can be further improved.

The two welding portions of each of the first and second legs of the electrical conductors can be oriented away from each other, which can in particular be the case when the winding is corrugated. As a variant, they can be oriented in the same direction, which can in particular be the case when the winding is overlapping.

Another object is the provision of a stator for a rotary electric machine, comprising a stator body comprising notches, electrical conductors housed in the notches, at least some of the electrical conductors, or even a majority of the electrical conductors, being in the form of a U-shaped pin, each comprising first and second legs extending axially in first A and second R notches, respectively, the first A and second R notches being separated by a number Np of notches. The number Np of notches is the same for all the electrical conductors of the stator in the form of U-shaped pins.

For the number Np of notches, reference may also be made to the pitch of an electrical conductor, which is the same for all the electrical conductors of the stator that are in the form of a U-shaped pin. This facilitates the manufacture of the U-shaped pins, and the step of positioning them in the stator body is simplified, in particular their insertion.

At least one of the first and second legs of the electrical conductors can be extended out of the notches via a welding portion that is inclined with respect to a plane perpendicular to a longitudinal axis of the stator to overhang the stator body circumferentially at a notch, this notch being separated from the first A or the second R notch, respectively, by a number N1 and/or N2 of teeth. The numbers N1 and N2 can be equal or different.

In one embodiment, N1 can vary from Np/2−0.5 to Np notches, and N2 can vary from 0 to Np/2+0.5 notches. In one embodiment, N1 is equal to Np and N2 is equal to 0. In another embodiment, N1 and N2 are equal, being equal to Np/2 or Np/2+0.5 or Np/2−0.5.

In one embodiment, the welding portion of the second leg of the electrical conductor is aligned with said leg. In this case, N2 is zero.

In the other cases where N2 is non-zero, each of the first and second legs of the electrical conductors can be extended out of the notches via a welding portion that is inclined with respect to a plane perpendicular to a longitudinal axis of the stator to overhang the stator body circumferentially at a notch, this notch being separated from the first A or the second R notch, respectively, by a number N1 and N2 of teeth, the numbers N1 and N2 possibly being equal or different.

Pin Legs

At least some of the electrical conductors each have a welding portion that is innermost with respect to the longitudinal axis of the stator, or even a majority, better still all the electrical conductors each have a welding portion that is innermost with respect to the longitudinal axis of the stator.

At least some of the electrical conductors each have a welding portion that is outermost with respect to the longitudinal axis of the stator, or even a majority, better still all the electrical conductors each have a welding portion that is outermost with respect to the longitudinal axis of the stator.

The inner portions are disposed closer to the rotor than the outer portions.

The innermost welding portions are inclined with the same inclination with respect to the plane perpendicular to the longitudinal axis of the stator. These innermost welding portions all extend parallel to each other.

As regards the outermost welding portions, they are not necessarily all inclined with the same inclination with respect to the plane perpendicular to the longitudinal axis of the stator. They can be inclined with at least two, or even three or four, different inclinations with respect to the plane perpendicular to the longitudinal axis of the stator.

In one embodiment, the outermost welding portions of the electrical conductors are inclined with at least two, or even three or four, different inclinations with respect to the plane perpendicular to the longitudinal axis of the stator.

The first leg can be arranged closer to the rotor than the second leg. The second leg can be arranged closer to the yoke of the stator than the first leg. Alternatively, the first leg may be arranged closer to the yoke of the stator than the second leg, and the second leg may be arranged closer to the rotor than the first leg.

At least some of the electrical conductors may have a second leg extending out of the notch via a welding portion extending in the same radial plane as the second leg, or even being aligned therewith. When only the first leg of the electrical conductors has an inclined welding portion, the manufacture of the stator is facilitated, insofar as the operations of inclining the pins can be simplified and accelerated. In this configuration, only one of the legs of the electrical conductor is inclined, so that it is thus possible to limit the deformations and the stresses on the electrical conductors. In particular, it is thus possible to reduce the risks of electrical contact between the phases of the stator winding.

In one embodiment, only the first leg of the electrical conductors has an angled welding portion. The welding portion of the second leg can be aligned with the second leg, extending in the extension of the latter and being rectilinear therewith. When only the first leg of the electrical conductors has an angled welding portion, the first leg can be arranged closer to the rotor than the second leg. Alternatively, the first angled leg may be arranged closer to the yoke of the stator than the second leg.

At least part of the electrical conductors may have a second leg extending out of the notch via a welding portion making a recess relative to the notch, while extending in the same radial plane as the second leg. The recess of the electrical conductor can make it possible to reach the metallic elements of a phase connector. The metallic elements can be arranged radially externally with respect to the electrical conductors to which they are connected.

At least some of the electrical conductors may have a second leg extending out of the notch via a circumferentially extending welding portion.

At least some of the electrical conductors may have a second leg extending out of the notch via a welding portion extending out of a circumferential surface. These welding portions outside a circumferential surface can make it possible to reach a phase connector that can be arranged around, rather than above, the welding portions relative to a longitudinal axis of the stator.

The stator may comprise two electrical conductors per notch.

The electrical conductors can form a distributed winding. The winding can be wavy or overlapping. The electrical conductors can form a fractional winding. The winding can be with full pitch. In one embodiment, the winding may have a shortened pitch.

Multi-Phase Winding

The electrical conductors housed in the notches can form a multiphase winding having at least a first phase a and a second phase b, an electrical input conductor A of the first phase a being located in a first notch (notch number 1), one or more electrical conductors of the second phase b being located in a second notch (notch number 2), the second notch immediately following the first notch when moving circumferentially around the axis of rotation of the machine, in the direction of flow of the electric current around the axis of rotation of the machine.

The electrical input conductor of the first phase is in this case located in a first notch just before a second notch receiving one or more electrical conductors of the second phase, when moving circumferentially around the axis of rotation of the machine, in the direction of flow of the electric current around the axis of rotation of the machine.

Thus, the electrical input conductor of the first phase is located opposite the usual position, namely a position in which the first notch receiving the electrical input conductor of the first phase is immediately followed by a second notch receiving one or more electrical conductors of the same first phase, when moving circumferentially around the axis of rotation of the machine, in the direction of flow of the electric current around the axis of rotation of the machine.

The input notch of a first phase can be followed by a notch housing electrical conductors of a second phase different from the first.

Thus, the number of notches between the electrical input conductor and the electrical output conductor of the same phase is reduced. The first input notch of a phase can be brought closer to a third output notch of this same phase. In other words, the number of notches separating the first input notch of a phase and the third output notch of the same phase can be smaller. Thus, it possible to reduce the tooth pitch of the electrical conductors that serve to connect the various winding paths, which progresses in the same direction around the axis of rotation of the machine, and the average length of each phase owing to a better nesting of the sub-assemblies of electrical conductors constituting the winding, measured circumferentially around the axis of rotation of the machine. Shortening the average length of a phase improves linear resistance and thermal performance, and reduces the mass of copper required.

It is also possible to obtain shorter coil heads for the electrical conductors on the side opposite the welds. The quantity of copper necessary to manufacture the conductors is therefore reduced, which is economically advantageous. In addition, the insertion of the electrical conductors in the notches can be facilitated.

Furthermore, an electrical output conductor of the first phase may be located in a first notch, one or more electrical conductors of the second phase being located in a second notch, the second notch immediately following the first notch when moving circumferentially around the axis of rotation of the machine, in the direction of flow of the electric current around the axis of rotation of the machine.

The electrical output conductor of the first phase can be located in a first notch just before a second notch receiving one or more electrical conductors of the second phase, when moving circumferentially around the axis of rotation of the machine, in the direction of flow of the electric current around the axis of rotation of the machine.

Thus, the electrical output conductor of the first phase is located opposite the usual position, namely a position in which the first notch receiving the electrical output conductor of the first phase is immediately followed by a second notch receiving one or more electrical conductors of the same first phase, when moving circumferentially around the axis of rotation of the machine, in the direction of flow of the electric current around the axis of rotation of the machine.

The output notch of a first phase can be followed by a notch housing electrical conductors of a second phase different from the first.

The phase inputs can be offset by an angle of 30°, 60°, 90 or by an angle of 120°, for example.

The second notch can comprise one or more electrical conductors of the same phase only.

The first input notch of a first phase may comprise one or more electrical conductors of the first phase only.

As a variant, the first input notch of a first phase may comprise one or more electrical conductors of the first phase and one or more electrical conductors of the second phase. The electrical conductor(s) of the first phase can be placed on the side of the yoke or alternatively on the side of the air gap. The electrical conductor(s) of the second phase can be placed on the side of the air gap or, as a variant, on the side of the yoke. The phase inputs and outputs can be placed on the yoke side or alternatively on the air gap side.

At least a first electrical conductor housed in a first notch can be electrically connected to a second electrical conductor housed in a second notch, at the outlet from said notches.

All the electrical conductors having a free end located at the same circumferential position about the axis of rotation of the machine, regardless of their radial position, can be electrically connected together.

The stator may comprise a phase connector comprising metallic elements connected to electrical conductors of the stator. The metallic elements can be arranged radially externally or internally with respect to the electrical conductors to which they are connected. The metallic elements connected to conductors of the stator windings can be held by an insulating support. Furthermore, the phase connector may have tabs for connection to a power supply bus. The machine can thus be connected to an inverter that is electrically connected to the connection tabs of the connector.

Pins

At least some electrical conductors, if not a majority of the electrical conductors, can be in the form of U or I pins. The pin can be U-shaped ("U-pin") or straight, being I-shaped ("I-pin").

The pin and flat electrical conductors increase the filling coefficient of the notch, making the machine more compact. Owing to a high filling coefficient, the thermal exchanges between the electrical conductors and the stator body are improved, which makes it possible to reduce the temperature of the electrical conductors inside the notches.

Furthermore, the manufacture of the stator can be facilitated by the electrical conductors in pin form. Finally, since the pins do not need to have open notches, it is possible to have closed notches that make it possible to hold the pins, and it is therefore possible to eliminate the step of inserting stator shims.

Electrical conductors, or even a majority of electrical conductors, extend axially in the notches. The electrical conductors can be introduced into the corresponding notches by one or both axial ends of the machine.

An I-shaped electrical conductor has two axial ends each placed at one of the axial ends of the stator. It passes through a single notch, and can be welded at each of its axial ends to two other electrical conductors, at the axial ends of the stator. The stator may for example comprise 6, 10, 12, 14, 18, 22 or 26 electrical conductors in the shape of an I, the other electrical conductors possibly all being in the shape of a U.

The stator may be devoid of an I-shaped electrical conductor.

A U-shaped electrical conductor has two axial ends both placed at one of the axial ends of the stator. These two axial ends are defined by the two legs of the U. It passes through two different notches, and can be welded at each of its axial ends to two other electrical conductors, at the same axial side of the stator. The bottom of the U, that is to say, the side of the U forming the coil or coil head, is placed on the other axial side of the stator.

At least some of the electrical conductors, if not a majority of the electrical conductors, can be in the form of U-pins.

In addition, the size of the electrical conductors at the coil heads is reduced. This facilitates the nesting of the electrical conductors.

The winding can be devoid of a U-shaped pin with a width different from Np. In some embodiments of the prior art, there are U-pins of at least three different widths. The width of a U-pin is equal to the number of tooth pitches+1. The width of a U-pin is defined by the number of notches separating the first and second legs of the U-pin, including the two notches accommodating the two legs of the U-pin in question. The first and second legs can be separated by a number of notches between 3 and 20, better still between 6 and 16, for example 6, 7, 8, 9, or 10 or 11 notches.

Strands

Each electrical conductor may comprise one or more strands (also called "wire"). "Strand" refers to the most basic unit for electrical conduction. A strand can be of round cross-section, which may then be called "wire," or it may be flat. The flat strands can be shaped into pins, for example U or I pins. Each strand is coated with an insulating enamel.

The fact that each notch can comprise several conductors and/or several strands makes it possible to minimize losses by induced currents, or Joule AC losses, which vary with the square of the supply frequency, which is particularly advantageous at high frequency and when the operating speed is high. The heat transfer to the cold source is also facilitated. It is thus possible to obtain better efficiency at high speed.

When the notches are closed, it is possible to obtain a reduction in the leakage fluxes seen by the conductors, which leads to a reduction in eddy current losses in the strands.

In one embodiment, each electrical conductor may comprise several pins, each forming a strand, as explained above. All the strands of the same electrical conductor can be electrically connected to each other at the outlet of the notch. The strands electrically connected to each other are placed in short circuit. The number of strands electrically connected together may be greater than or equal to 2, being for example between 2 and 12, being for example 3, 4, 6 or 8 strands.

Several strands can form the same electrical conductor. The same electric current of the same phase flows in all the strands of the same electrical conductor. All the strands of the same electrical conductor can be electrically connected to each other, in particular at the outlet of the notch. All the strands of the same electrical conductor can be electrically connected to each other at each of their two axial ends, in particular at the outlet of the notch. They can be electrically connected in parallel.

All the strands of all the electrical conductors having a free end located at the same circumferential position about the axis of rotation of the machine, regardless of their radial position, can be electrically connected to one another.

In one embodiment, each electrical conductor comprises a single strand. In another embodiment, each electrical conductor comprises three strands.

In the case where a notch comprises two electrical conductors, a notch can therefore house two strands, or in a variant six strands, for example, distributed between the two electrical conductors.

In a variant, a notch comprises four electrical conductors. Each electrical conductor can comprise two strands. The notch then houses eight strands, distributed between the four electrical conductors.

The strands can be positioned in the notch so that their circumferential dimension around the axis of rotation of the machine is greater than their radial dimension. Such a configuration allows a reduction in eddy current losses in the strands.

A strand may have a width of between 1 and 5 mmm, for example of the order of 2.5 or 3 mm. The width of a strand is defined as its dimension in the circumferential direction about the axis of rotation of the machine.

A strand may have a height of between 1 and 5 mm, for example of the order of 1.6 or 1.8 mm. The height of a strand is defined as its thickness in the radial dimension.

The electrical conductors can be made of copper or aluminum.

Winding

A winding is made up of a number m of phases offset in space in such a way that when supplied by a multi-phase current system, they produce a rotating field.

The electrical conductors can form a single winding, in particular with full or fractional pitch. "Single winding" means that the electrical conductors are electrically connected together in the stator, and that the connections between the phases are made in the stator, and not outside the stator, for example in a terminal box.

The electrical conductors can form a distributed winding. The winding is not concentrated or wound on a tooth.

The winding can be with full pitch. Each notch only accommodates electrical conductors of the same phase and/or the width of an electrical conductor is equal to the number of notches divided by the number of poles.

As a variant, the winding can be with shortened pitch. Notches can accommodate electrical conductors of different phases. In one embodiment, at least one notch accommodates an electrical conductor of the first phase and an electrical conductor of the second phase and/or the width of the majority of the electrical conductors is less than the number of notches divided by the number of poles.

The winding can be whole or fractional. The winding can be whole in pitch with or without shortening, or fractional in a variant. In one embodiment, the electrical conductors form a fractional winding.

For a fractional winding, the number of notches per pole and per phase is fractional, i.e. the ratio q defined by $q=Ne/(2pm)$ is written as an irreducible fraction $z/n$, z and n being two non-zero integers, n being different from 1, where Ne is the number of notches of the stator, m the number of phases of the winding and p the number of pairs of stator poles.

The number of notches in the stator can be between 18 and 96, better still between 30 and 84, being for example 18, 24, 27, 30, 36, 42, 45, 48, 54, 60, 63, 72, 78, 81, 92, 96, or even more preferably being 60 or 63. The number of poles of the stator can be between 2 and 24, or even between 4 and 12, for example 6 or 8.

The combination of number of notches/number of stator poles can be chosen from the combinations of the following list, which is not exhaustive: 30/4, 42/4, 45/6, 48/8, 63/6, 60/8, 78/8, 84/8.

In one embodiment, the combination of number of notches/number of stator poles is 60/8. In this case we have $q=60/(2*4*3)=5/2$.

In one embodiment, the combination of number of notches/number of pairs of stator poles is 63/6 or In this case we have $q=63/(2*3*3)=7/2$.

More broadly, the combination between the number of notches Ne and the number of pairs of stator poles p may be one of those checked in Tables 1 (a) and 1 (b) below, for a three-phase winding.

TABLE 1a

| p | Ns=3 | 6 | 9 | 12 | 15 | 18 | 21 | 24 | 27 | 30 | 33 | 36 | 39 | 42 | 45 |
|---|---|---|---|---|---|---|---|---|---|---|---|---|---|---|---|
| 1 | x |   | x |   | x |   | x |   | x |   | x |   | x |   | x |
| 2 |   | x | x |   | x | x | x |   | x | x | x |   | x | x | x |
| 3 |   |   | x |   |   |   |   |   | x |   |   |   |   |   | x |
| 4 |   |   |   | x | x | x | x |   | x | x | x | x | x | x | x |
| 5 |   |   |   | x | x | x | x | x | x |   | x | x | x | x | x |
| 6 |   |   |   |   |   | x |   |   | x |   |   |   |   |   | x |
| 7 |   |   |   |   | x | x | x | x | x | x | x | x | x | x | x |
| 8 |   |   |   |   |   | x | x | x | x | x | x | x | x | x | x |
| 9 |   |   |   |   |   |   |   |   | x |   |   |   |   |   |   |
| 10 |   |   |   |   |   |   | x | x | x | x | x | x | x | x | x |
| 11 |   |   |   |   |   |   |   | x | x | x | x | x | x | x | x |

TABLE 1(b)

| p | Ns=48 | 51 | 54 | 57 | 60 | 63 | 66 | 69 | 72 | 75 | 78 | 81 | 84 | 87 | 90 |
|---|---|---|---|---|---|---|---|---|---|---|---|---|---|---|---|
| 1 |   | X |   | X |   | X |   | X |   | X |   | X |   | X |   |
| 2 |   | X | X | X |   | X | X | X |   | X | X | X |   | X | X |
| 3 |   |   |   |   |   | X |   |   |   |   |   | X |   |   |   |
| 4 |   | X | X | X | X | X | X | X |   | X | X | X | X | X | X |
| 5 | X | X | X | X |   | X | X | X | X | X | X | X | X | X |   |
| 6 |   |   | X |   |   | X |   |   |   |   |   | X |   |   | X |
| 7 | X | X | X | X | X | X | X | X | X | X | X |   |   | X | X |
| 8 |   | X | X | X | X | X | X | X | X | X | X | X | X | X | X |
| 9 |   |   |   | X |   |   |   |   |   |   |   | X |   |   |   |
| 10 | X | X | X | X |   | X | X | X | X | X | X | X | X | X | X |
| 11 | X | X | X | X | X | X |   | X | X | X | X | X | X | X | X |

The number of phases is three in this case, but the number of phases can be different, two for example, the machine then comprising a two-phase winding, or for example 5, 6, 7, 9, 11 or 13 The winding is polyphase.

The electrical conductors can be placed in series in a so-called wave winding or in a so-called overlapping winding.

The term "wave winding" is understood to mean a winding in which the electrical conductors of the same phase and of the same pole are electrically connected to one another so that, for a winding path, the electric current of the phase circulates in the electrical conductors rotating about the axis of rotation of the machine, always in one direction. For a winding path, the electrical conductors of the same phase and the same pole do not overlap when observed perpendicular to the axis of rotation of the machine.

The term "overlapping winding" is understood to mean a winding in which the electrical conductors of the same phase of the same pole are electrically connected to one another so that the electric current of the phase circulates in the electrical conductors rotating about the axis of rotation of the machine alternatingly in one direction, then in the other. For a winding path, the electrical conductors of the same phase and the same pole overlap when observed perpendicular to the rotation axis of the machine.

The winding may comprise a single winding path or several winding paths. The current of the same phase flows by winding path in an "electrical conductor." "Winding path" means all the electrical conductors of the machine that are traversed by the same electric current of the same phase.

These electrical conductors can be connected to each other in series or in parallel or in series-parallel. In the case where there is only one path, the electrical conductors are connected in series. In the case where there are several paths, the electrical conductors of each path are connected in series, and the paths are connected in parallel.

Electrical Conductors

The current of the same phase flows by winding path in an "electrical conductor." Several conductors in series form a "coil." The number of coils per phase is at most equal to the number of poles of the stator or to the number of pairs of poles.

In each notch there can be one or more layers. "Layer" refers to the series conductors belonging to the same phase arranged in the same notch. In each layer of a notch, there are electrical conductors of the same phase. In general, the electrical conductors of a stator can be distributed in one layer or in two layers. When the electrical conductors are distributed in a single layer, each notch only houses electrical conductors of the same phase.

The electrical conductors can be divided into only two layers. In this case, one or more notches can house electrical conductors of two different phases. This is always the case for a winding with shortened pitch. In one embodiment, the winding may not comprise more than two layers. In one embodiment, it is notably devoid of four layers.

At least a first electrical conductor housed in a first notch can be electrically connected to a second electrical conductor housed in a second notch, at the outlet from said notches.

"Electrically connected" means any type of electrical connection, in particular by welding, with different possible welding methods, in particular laser, induction, friction, ultrasound, vibrations or brazing, or by mechanical clamping, in particular by crimping, screwing or riveting for example. The welding step can be carried out by means of a heat source, in particular a laser or an electric arc, for example an electric arc produced by means of a tungsten electrode. The welding method using a tungsten electrode can be TIG ("Tungsten Inert Gas") welding. In this welding method, the electric arc is produced from a tungsten electrode and a plasma. Using a heat source makes it possible to melt the free ends of the strands without degrading the assembly of the strands of the conductor(s). A single heat source can be used to produce the same weld. Alternatively, several heat sources can be used to produce the same weld.

The first and second electrical conductors can be electrically connected to the output of the notches, that is to say, the electrical connection is formed on the electrical conductors just after they leave the two notches, at an axial end of the stator body. The electrical connection can be made in a plane perpendicular to the axis of rotation of the machine. The plane of the electrical connection can be about 30 to 70 mm away from the stator body, better still about 40 to 60 mm away.

The electrical conductors can be arranged in the notches in a distributed manner. "Distributed" means that the outgoing and return electrical conductors are each housed in different and non-consecutive notches. At least one of the electrical conductors can pass successively through two non-consecutive notches.

The electrical conductors can be arranged in a row in the notches. "Row" means that the electrical conductors are not arranged in the notches in bulk, but in an orderly manner. They are stacked in the notches in a non-random manner, for example arranged in a row of electrical conductors aligned in the radial direction.

The electrical conductors may have a generally rectangular cross-section, in particular with rounded edges. The circumferential dimension of an electrical conductor can correspond substantially to the width of a notch. Thus, a notch may comprise only a single electrical conductor in its width. The width of the notch is measured in its circumferential dimension about the axis of rotation of the machine.

The electrical conductors can be adjacent to each other by their long sides, otherwise called the flat.

Optimizing the stack can make it possible to place a greater quantity of electrical conductors in the notches.

The stator may comprise a sensor for measuring the temperature of the electrical conductors, for example a thermocouple. The sensor can be arranged in the notch, or in a variant at the welding portions.

At least one tooth, better still all the teeth, may be generally trapezoidal in cross-section. At least one tooth, better still all the teeth, may have divergent edges moving away from the axis of rotation of the machine.

The stator body can be produced by stacking sheets. The teeth are connected to each other by material bridges, and on the opposite side by a yoke. The closed notches can be produced entirely by cutting from the sheets. Each sheet of the stack of sheets can be in one piece.

Each sheet is for example cut from a magnetic steel sheet or a sheet containing magnetic steel, for example steel 0.1 to 1.5 mm thick. The sheets can be coated with an electrically insulating varnish on their opposite faces before they are assembled within the stack. Electrical insulation can also be obtained by heat treatment of the sheets, if necessary.

In a variant, the stator body can be made from a compacted or agglomerated magnetic powder.

Machine and Rotor

Another object is the provision of a rotary electric machine, such as a synchronous motor or a synchronous generator, comprising a stator as defined above. The machine can be synchronous or asynchronous. The machine can be a reluctance machine. It can constitute a synchronous motor.

The maximum speed of rotation of the machine can be high, being for example greater than 10,000 rpm, better still greater than 12,000 rpm, being for example of the order of 14,000 rpm to 15,000 rpm, or even 20,000 rpm or 25,000 rpm. The maximum speed of rotation of the machine may be less than 100,000 rpm, or even 60,000 rpm, or even less than 40,000 rpm, better still less than 30,000 rpm.

The rotary electric machine may comprise a rotor. The rotor can be a permanent magnet rotor, with surface or buried magnets. The rotor can be in flux concentration. It can comprise one or more layers of magnets arranged in an I, a U or a V. In a variant, it may be a wound or squirrel cage rotor, or a variable reluctance rotor.

The diameter of the rotor may be less than 400 mm, better still less than 300 mm, and greater than 50 mm, better still greater than 70 mm, for example between 100 and 200 mm.

The rotor may comprise a rotor body extending along the axis of rotation and arranged around a shaft. The shaft may comprise torque transmission means for driving the rotor body in rotation.

The rotor may or may not be cantilevered.

The machine can be inserted alone in a casing or inserted in a gearbox housing. In this case, it is inserted in a casing that also houses a gearbox.

Manufacturing Method

Another object is the provision of a method for manufacturing a stator for a rotary electric machine, in particular a stator as defined above, in which electrical conductors are placed in the notches of a stator body of the stator by inserting them into the corresponding notches via one or both axial ends of the stator.

At least one electrical conductor, or even a majority of the electrical conductors, introduced into the notches are in the form of a U-pin. They can be shaped into pins prior to their introduction into the notches. All the electrical conductors in the form of a U-shaped pin can be shaped, simultaneously or successively, then introduced into the stator body simultaneously or successively.

The shaping may comprise a first step of assembling the strands of the same electrical conductor.

A second shaping step can be implemented after they are introduced into the notches. This may in particular include the inclination of the welding portions.

The same U-shaped electrical conductor can be placed in two different non-consecutive notches of the stator body of the stator. In the case where an electrical conductor is U-shaped, it can be welded to two other electrical conductors on the same side of the machine.

BRIEF DESCRIPTION OF THE DRAWINGS

The invention may be better understood on reading the detailed description which follows, of non-limiting embodiments thereof, and on examining the appended drawing, in which:

FIG. 4a is a schematic and partial perspective view of the electrical conductors of a phase of the stator of FIG. 1.

FIG. 4b is a schematic and partial perspective view of the electrical conductors of a phase of the stator of FIG. 1.

FIG. 4c is a schematic and partial perspective view of the electrical conductors of a phase of the stator of FIG. 1.

FIG. 6 is a view similar to FIG. 1 of an alternative embodiment.

FIG. 7 is a schematic and partial perspective view of the stator of FIG. 6.

FIG. 8 is a schematic and partial top view of the stator of FIG. 6.

FIG. 9 is a top view, similar to FIG. 8, of the winding of the stator of FIG. 6.

FIG. 12 is a schematic and partial perspective view of the electrical conductors of a phase of the stator of FIG. 6.

FIG. 13a is a schematic and partial perspective view of an electrical conductor of the stator of FIG. 6.

DETAILED DESCRIPTION

Figure 1:
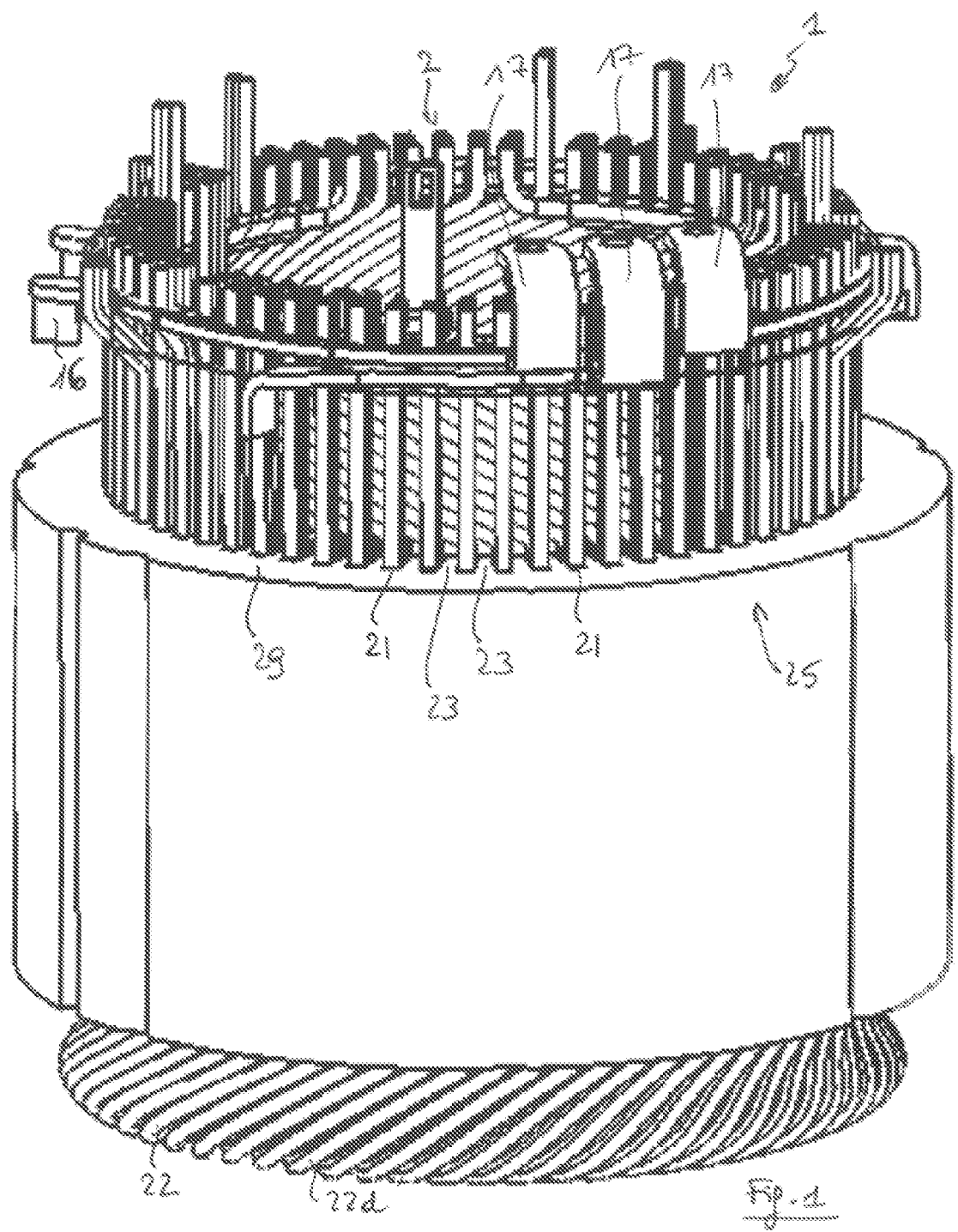
FIG. 1 is a schematic and partial perspective view of a stator.

FIGS. 1 to 5b show a stator 2 of a rotary electric machine 1 also comprising a rotor, not shown. The stator makes it possible to generate a rotating magnetic field for driving the rotating rotor, in the context of a synchronous motor, and in the case of an alternator, the rotation of the rotor induces an electromotive force in the electrical conductors of the stator.

The examples illustrated below are schematic and the relative dimensions of the various component elements have not necessarily been observed.

The stator 2 comprises electrical conductors 22, which are arranged in notches 21 formed between teeth 23 of a stator body 25. The notches 21 are closed. The notches 21 are closed on the side of the air gap by material bridges 27, each connecting two consecutive teeth of the stator body 25, and on the opposite side by a yoke 29. The yoke and the teeth 23 are in one piece. The electrical conductors 22 can for the most part be in the form of pins, namely U or I pins, and extend axially in the notches.

In the example described, all the electrical conductors 22 of the stator 2 are identical, all being U-shaped pins, with the same pitch Np for all the electrical conductors of the stator that are U-shaped pins. Each electrical conductor in the form of a U-shaped pin has first 22$e$ and second 22$f$ legs extending axially in first A and second R notches, respectively. The first A and second R notches are separated by a number Np of notches and by a number Nd of teeth. The number Np of notches is the same for all the electrical conductors of the stator in the form of U-shaped pin. In the example described, Np is 11. The number Nd of teeth is the same for all the electrical conductors of the stator in the form of U-shaped pins. In the example described, Nd is 10.

Figure 2:
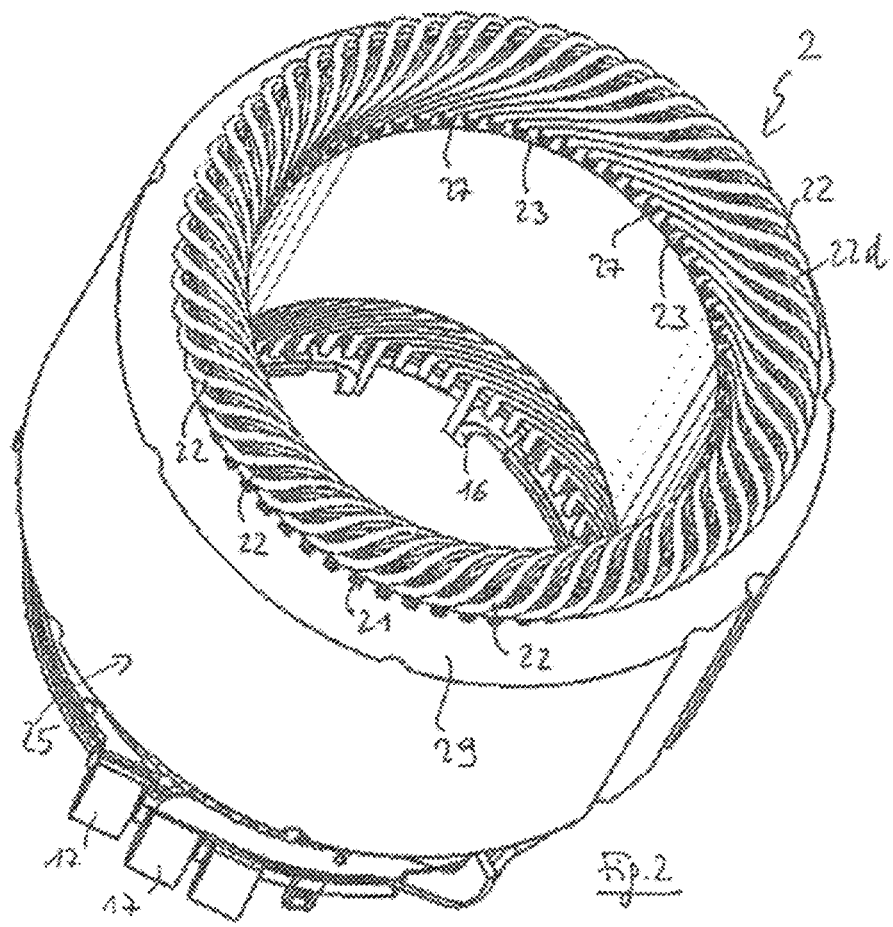
FIG. 2 is a schematic and partial perspective view of the stator of FIG. 1.

The constant spacing between the legs of all the electrical conductors 22 makes it possible to reduce the height of the lead-in wires 22$d$ on the side opposite the welds, as visible in FIG. 2, as well as to have a more regular spacing between each of the lead-in wires 22$d$.

Figure 3:
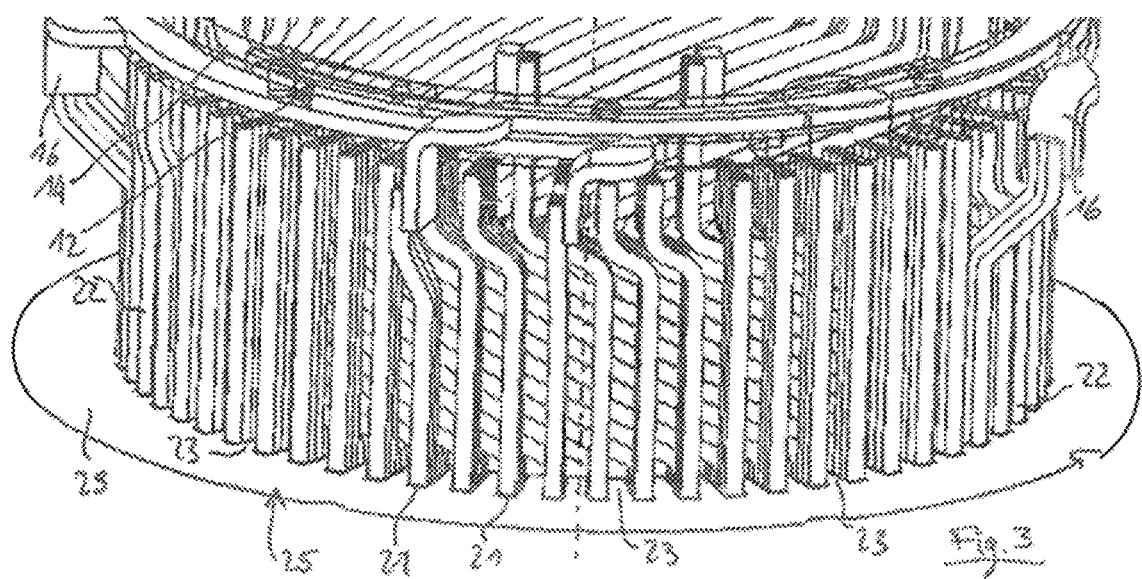
FIG. 3 is a detail perspective view of the stator of FIG. 1.

Space is also freed up on either side of the pins at the notch output, which can make it possible to position the connections there to the other phases or to an inverter, on the side of the stator yoke, as illustrated in FIGS. 1 and 3.

For this purpose, the stator may comprise a phase connector 12 comprising metallic elements 16 connected to electrical conductors 22 of the stator. The metallic elements 16 are arranged radially externally with respect to the electrical conductors 22 to which they are connected. The metallic elements 16 connected to conductors are held by an insulating support 14. Furthermore, the phase connector may have tabs for disconnection from a power supply bus. The machine 1 can thus be connected to an inverter (not shown) that is electrically connected to the connection tabs 17 of the connector 12.

In the described example, a first electrical conductor housed in a first notch is electrically connected to a second electrical conductor housed in a second notch, at the outlet from said notches. The first and second notches are non-consecutive. In the illustrated example, they are separated by 12 other notches and by 11 teeth. In a variant, the first and second notches are separated by 3, 4, 5, 6, 7, 8, 9, 10, 11 or 13 other notches, for example, and by 2, 3, 4, 5, 6, 7, 8, 9, 10, 12 or 13 teeth.

In particular, FIGS. 4$a$ to 4$c$ show the end surfaces 22$a$ of the electrical conductors intended to receive the electrical connection. The electrical connection is made in a plane perpendicular to the axis of rotation of the machine. The plane of the electrical connection can be about 40 to 60 mm away from the stator body.

The electrical conductors are arranged in the notches in a distributed manner, and they form a distributed winding, which is fractional in the described example. In this example, the number of notches is 63. The number of stator poles is 6. Thus, the combination of number of notches/number of stator poles is 63/6.

The electrical conductors form a fractional winding, for which the ratio q defined by q=Ne/(2 pm) is written as an irreducible fraction z/n, z and n being two non-zero integers, n being different from 1, where Ne is the number of notches of the stator, m the number of phases of the winding and p the number of pairs of stator poles. In particular, FIG. 4 shows a one-phase coil in isolation in the case of a three-phase fractional winding. We then have q=63/(3×6)=7/2 for this machine with 63 notches and 6 poles. A coil is formed by the outgoing electrical conductors of the same phase passing through adjacent notches, and by the return electrical conductors of the same phase passing through adjacent notches.

The electrical conductors 22 are made of copper or aluminum, or any other conductive material enameled or coated with any other suitable insulating coating.

The electrical conductors 22 are arranged in a row in the notches 21, in a row of aligned electrical conductors.

The electrical conductors may have a generally rectangular cross-section, in particular with rounded corners. In the described example, they are superimposed radially in a single row. The circumferential dimension of an electrical conductor can correspond substantially to the width of a notch. Thus, the notch comprises only one electrical conductor in its width. It can comprise several electrical conductors in its radial dimension. It comprises two in the described example.

Furthermore, the electrical conductors in pin form each have first 22$e$ and second 22$f$ legs that extend out of the notches via a welding portion 22$b$ that is inclined with respect to a plane perpendicular to a longitudinal axis of the stator to overhang the stator body circumferentially at a notch, this notch being separated from the first A or the second R notch, respectively, by a number N1 and/or N2 of teeth.

In the example described in reference to FIGS. 1 to 5$b$, the welding portion 22$b$ of the second leg 22$f$ of the electrical conductor 22 is aligned with said leg, as shown in FIG. 5$b$. In this case, N2 is zero. The first leg 22$e$ is arranged closer to the rotor than the second leg 22$f$. The second leg 22$f$ is arranged closer to the yoke of the stator than the first leg 22$e$. Thus, in this example, N1 is equal to 11.

For each electrical conductor, the innermost welding portion 22$b$ with respect to the longitudinal axis of the stator, which is arranged closer to the rotor, is inclined with the same inclination with respect to the plane perpendicular to the longitudinal axis of the stator as the other innermost welding portions.

For each electrical conductor, the outermost welding portion with respect to the longitudinal axis of the stator, which is arranged further from the rotor, is inclined with an inclination that may be different with respect to the plane perpendicular to the longitudinal axis of the stator as the other outermost welding portions. The outermost welding portions are not necessarily all inclined with the same inclination with respect to the plane perpendicular to the longitudinal axis of the stator. They can be inclined with at least two, or even three or four, different inclinations with respect to the plane perpendicular to the longitudinal axis of the stator.

Between two rectilinear welding portions 22$b$ of two consecutive second legs 22$f$ of two adjacent electrical conductors 22, it is possible, for example, to place a temperature probe or any other sensor, the two welding portions being well spaced apart. In one embodiment, the sensor can be threaded onto the rectilinear electrical conductor before welding the latter.

Figure 5A:
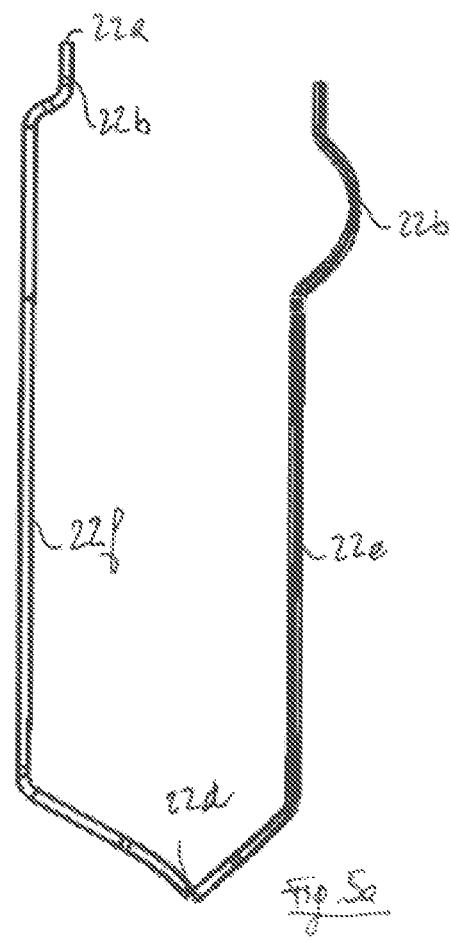
FIG. 5a is a schematic and partial perspective view of an electrical conductor of the stator of FIG. 1.
Figure 5B:
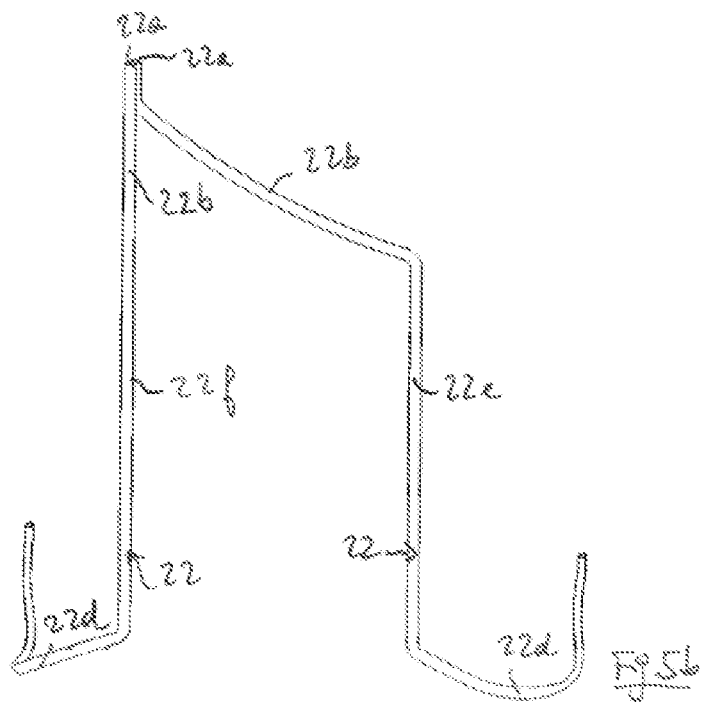
FIG. 5b is a schematic and partial perspective view of two electrical conductors of the stator of FIG. 1.
Figure 10:
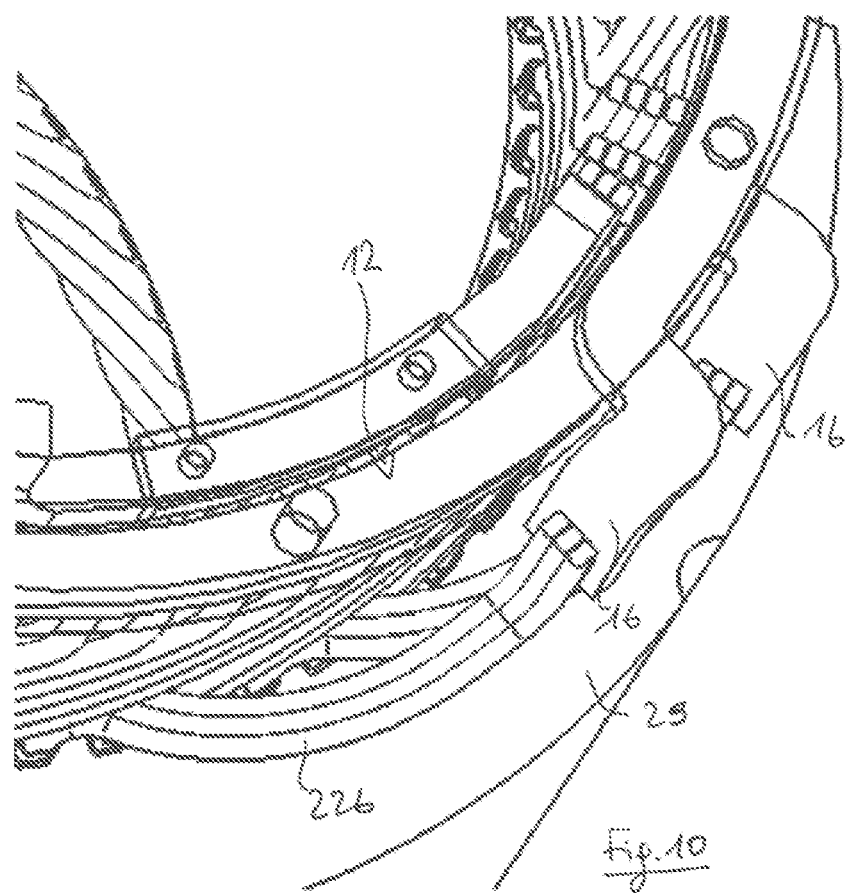
FIG. 10 is a detail perspective view of the stator of FIG. 6.

Furthermore, the electrical conductor illustrated in FIG. 5*a* has a second leg 22*f* extending out of the notch via a welding portion 22*b* forming a recess relative to the notch, while extending in the same radial plane as the second leg. This welding portion 22*b* is radially even further from the axis of rotation of the machine. This recess of the electrical conductor makes it possible to reach the metallic elements 16 of the phase connector 12.

Of course, it is not beyond the scope of the present invention if the values of the numbers N1 and N2 are different or equal. In the example just described, N1 is equal to Nd and N2 is equal to 0. N1 and N2 may be equal or substantially equal, being equal to Nd/2 or Nd/2+0.5 or Nd/2−0.5 or Nd/2+/−1 or Nd/2+1.5, as a function of the value of Nd.

In the embodiment illustrated in FIGS. 6 to 13*c*, the numbers N1 and N2 are substantially equal. In the illustrated example, Np being equal to 11 and Nd to 10, N1 is equal to 6 and N2 is equal to 5. For some electrical conductors in pin form, N2 can be equal to 6, in particular in the case where this electrical conductor is connected to the metallic elements 16 of the phase connector 12.

Each of the first 22*e* and second 22*f* legs of the electrical conductors 22 extend out of the notches via a welding portion 22*b* that is inclined with respect to a plane perpendicular to a longitudinal axis of the stator to overhang the stator body circumferentially at a notch, this notch being separated from the first A or the second R notch, respectively, by a number N1 and N2 of notches.

Figure 13B:
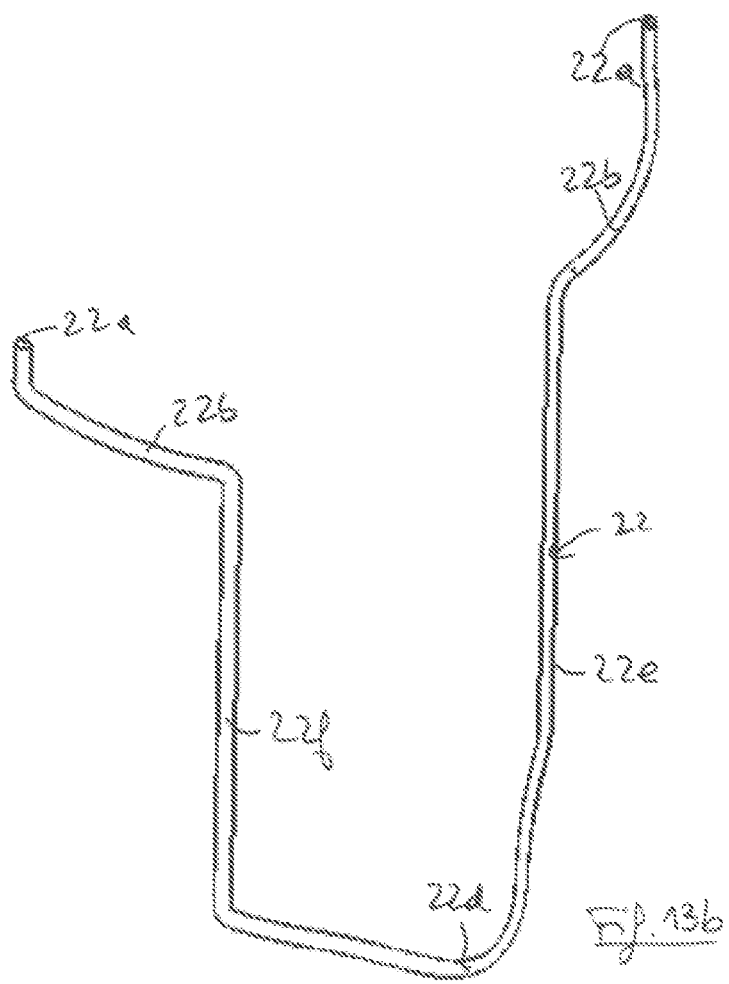
FIG. 13b is a schematic and partial perspective view of the same electrical conductor of the stator of FIG. 6.
Figure 13C:
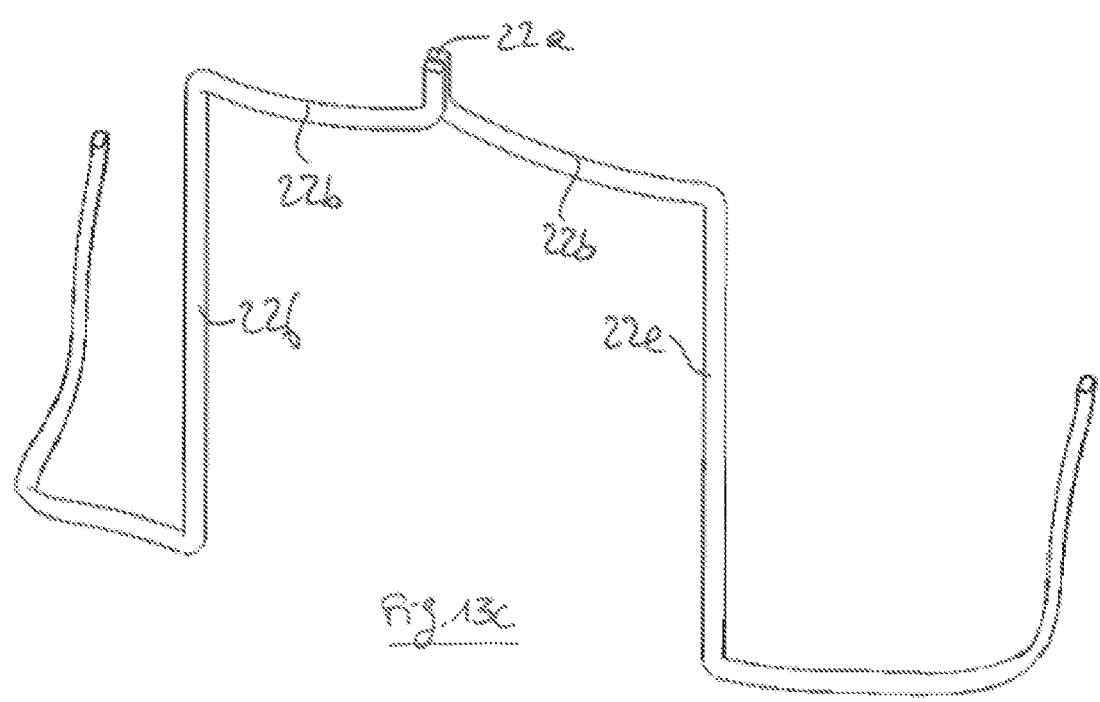
FIG. 13c is a schematic and partial perspective view of two electrical conductors of the stator of FIG. 6.

In the example described, as illustrated in FIGS. 13*a* to 13*c*, the two welding portions 22*b* of each of the first 22*e* and second 22*f* legs of the electrical conductors 22 are oriented away from each other.

Figure 11:
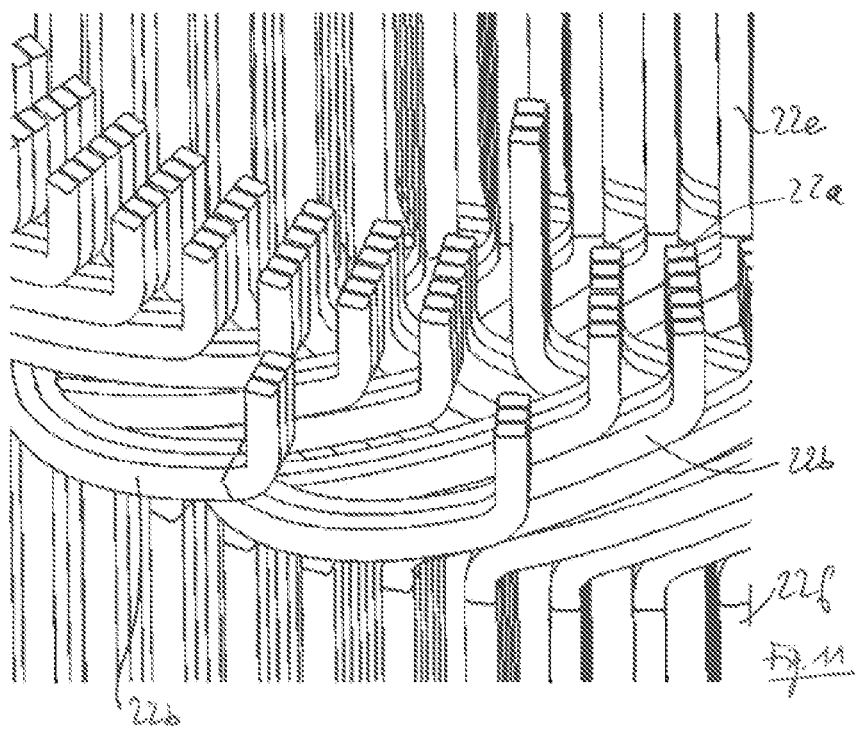
FIG. 11 is a detail perspective view of the winding of the stator of FIG. 6.
Figure 11A:
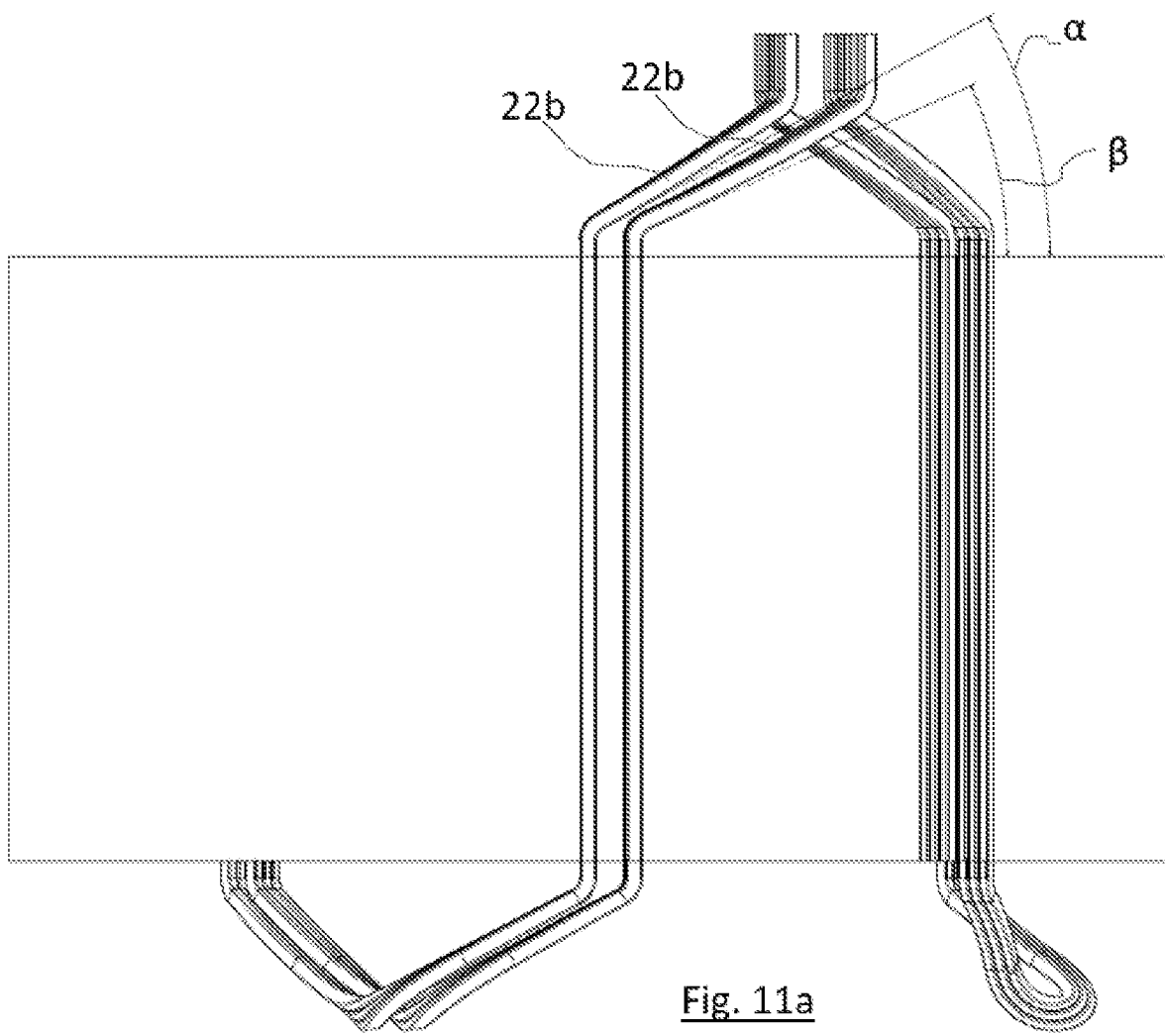
FIG. 11a is a schematic and partial perspective view of two electrical conductors of the stator of FIGS. 6 to 11.

FIG. 11 shows that the outermost welding portions 22*b* of the electrical conductors can be inclined with two different inclinations with respect to the plane perpendicular to the longitudinal axis of the stator. This configuration is illustrated in more detail in FIG. 11*a*, with two adjacent electrical conductors presented side by side, which each have an outermost welding portion 22*b*, the two outermost welding portions 22*b* being inclined with two different inclinations α and β. In this example, we have α, which is approximately 29°, and β, which is approximately 24°.

Furthermore, most of the electrical conductors 22 have a second leg 22*f* extending out of the notch via a welding portion 22*b* extending circumferentially, while some electrical conductors 22 have a second leg 22*f* extending out of the notch via a welding portion 22*b* extending outside a circumferential surface, as clearly visible in FIGS. 8 and 9. The welding portions 22*b* outside a circumferential surface can make it possible to reach a phase connector that can be arranged around, rather than above, the welding portions relative to a longitudinal axis of the stator, as visible in FIGS. 6, 10 and 11.

In another variant embodiment, the machine could comprise 60 notches, 60 teeth, 8 poles, electrical conductors in pin form each having first 22*e* and second 22*f* legs separated by 8 other notches and by 7 teeth. In this example, N1 can be between 3 and 8 and N2 between 0 and 4.

In the preceding examples, the winding is wavy. It is not beyond the scope of the present invention when the winding is overlapping.

The invention claimed is:

1. A stator of a rotary electric machine comprising a stator body comprising notches formed between teeth, electrical conductors being housed in the notches, at least one part of the electrical conductors being in the form of a U-shaped pin, each comprising first and second legs extending axially respectively in first and second notches, at least one of the first and second legs of the electrical conductors extending out of the notches via a welding portion that is inclined with respect to a plane perpendicular to a longitudinal axis of the stator so as to overhang the stator body circumferentially at a notch or a tooth, this notch or tooth being separated from the first or the second notch respectively by a number N1 and/or N2 of teeth, at least some of the electrical conductors each having an innermost welding portion relative to the longitudinal axis of the stator, said innermost welding portions being inclined with the same inclination with respect to the plane perpendicular to the longitudinal axis of the stator, the outermost welding portions of the electrical conductors being inclined with at least two, or even three or four, different inclinations with respect to the plane perpendicular to the longitudinal axis of the stator, the stator comprising only two electrical conductors per notch.

2. The stator according to claim 1, the first leg being arranged closer to the rotor than the second leg.

3. The stator according to claim 1, at least some of the electrical conductors having a second leg extending out of the notch via a welding portion extending in the same radial plane as the second leg, or even being aligned therewith.

4. The stator according to claim 1, at least part of the electrical conductors having a second leg extending out of the notch via a welding portion making a recess relative to the notch, while extending in the same radial plane as the second leg.

5. The stator according to claim 1, at least some of the electrical conductors having a second leg extending out of the notch via a circumferentially extending welding portion.

6. The stator according to claim 1, at least some of the electrical conductors having a second leg extending out of the notch via a welding portion extending out of a circumferential surface.

7. The stator according to claim 1, the first and second notches being separated by a number Nd of teeth, the number Nd of teeth being the same for all the electrical conductors of the stator in the form of U-shaped pins.

8. The stator according to claim 1, the electrical conductors forming a distributed winding.

9. The stator according to claim 1, the electrical conductors housed in the notches forming a multiphase winding having at least a first phase and a second phase, an electrical input conductor of the first phase being located in a first notch, one or more electrical conductors of the second phase being located in a second notch, the second notch immediately following the first notch when moving circumferentially around the axis of rotation of the machine, in the direction of flow of the electric current around the axis of rotation of the machine.

10. The stator according to claim 1, the second notch comprising one or more electrical conductors of the same phase only.

11. The stator according to claim 1, at least a first electrical conductor housed in a first notch being electrically connected to a second electrical conductor housed in a second notch, at the outlet from said notches.

12. The stator according to claim 1, wherein all the electrical conductors have a free end located at the same circumferential position about the axis of rotation of the machine, regardless of their radial position, are electrically connected together.

13. The stator according to claim 1, comprising a phase connector comprising metallic elements connected to electrical conductors of the stator, the metallic elements being arranged radially externally or internally with respect to the electrical conductors to which they are connected.

14. A rotary electric machine comprising the stator according to claim 1 and a rotor.

15. The stator according to claim 1 wherein the at least some of the conductors comprise I-shaped pins.

* * * * *